(No Model.)
E. W. BAXTER.
TWO WHEELED VEHICLE.
No. 357,809. Patented Feb. 15, 1887.
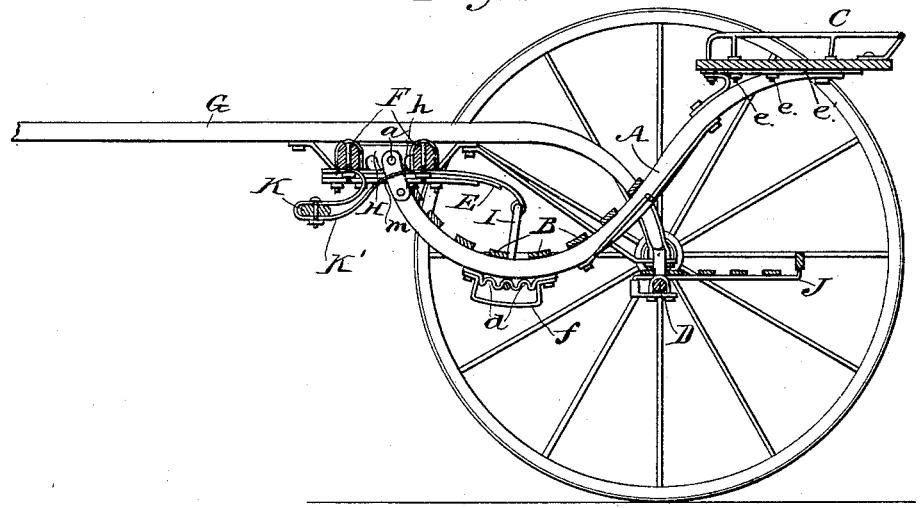
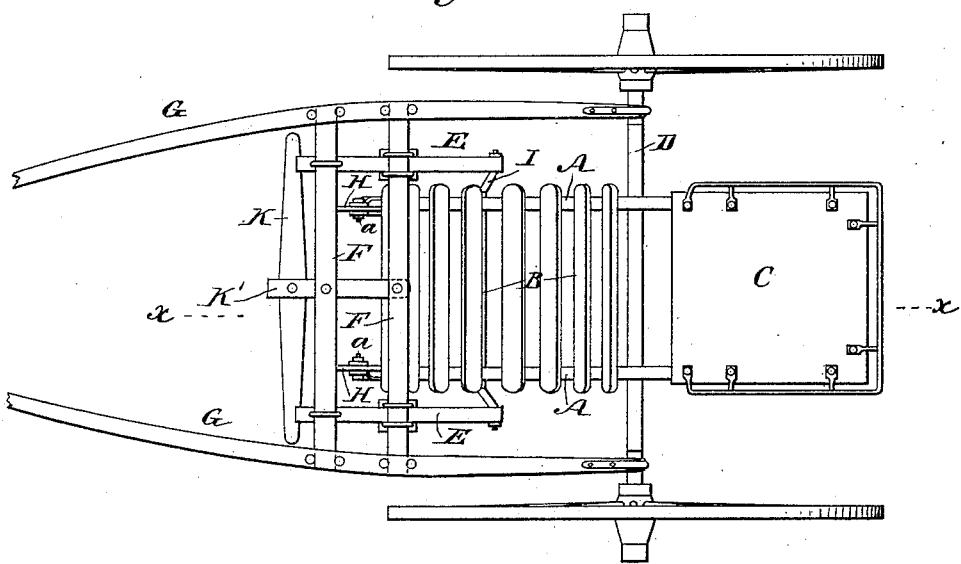
WITNESSES:
John A. Ellis
C. Sedgwick
INVENTOR:
E. W. Baxter
BY Munn & Co
ATTORNEYS.

UNITED STATES PATENT OFFICE.

EMERY W. BAXTER, OF BURR OAK, MICHIGAN.

TWO-WHEELED VEHICLE.

SPECIFICATION forming part of Letters Patent No. 357,809, dated February 15, 1887.

Application filed June 24, 1886. Serial No. 206,125. (No model.)

*To all whom it may concern:*

Be it known that I, EMERY W. BAXTER, of Burr Oak, in the county of St. Joseph and State of Michigan, have invented a new and Improved Two-Wheeled Vehicle, of which the following is a full, clear, and exact description.

The object of my invention is to provide a new and improved two-wheeled vehicle, the body and seat of which may be adjusted to suit the same to the rider; and the invention consists of the construction, arrangement, and combination of parts, all as hereinafter described and claimed.

Reference is to be had to the accompanying drawings, forming a part of this specification, in which similar letters of reference indicate corresponding parts in both the figures.

Figure 1 is a sectional elevation of the vehicle, taken on the line $xx$ of Fig. 2; and Fig. 2 is a plan view of the vehicle.

The body of the vehicle is composed of the bent side pieces, A A, the slats B B, and the seat C, secured to the upper rear end of the side pieces. The body is not supported directly upon the axle D, but indirectly therefrom by the rear ends of the springs E E, which are clipped to the cross-pieces F F, secured to the thills G G, which are attached to the axle in the usual manner. The forward ends of the side pieces, A A, are connected to the plates H H, attached to the cross-pieces F F, by bolts $a$, on which the side pieces are pivoted, and the connection between the body and the free ends of the springs E is effected by a pivoted or swing yoke, I. The plates H are formed with several notches, $h$, to receive the pins $a$, so that the body may be adjusted forward or backward for changing the relative position of the load with the springs, and the yoke I may be accordingly adjusted by placing it in one or the other of the series of notches $d$, formed in a plate secured to the under surface of each of the side pieces, A. A guard, $f$, is placed under each of the series of notches $d$, so that in adjusting the body there will be no danger of displacing the yoke I, and similar guards, $m$, will be placed under the notched plates H, to avoid all danger of displacement of the forward ends of the side pieces, A, and the guards $m f$ are placed such distances from the notches $h d$ that the body and yoke may be shifted by simply lifting the body and working the pivots $a$ and yoke I into different notches, thus adapting the body to be adjusted without removing and replacing bolts, nuts, or other fastening devices.

The seat C is connected to the side pieces, A, by bolts $e e$ under the seat, which pass through slots made in the irons $e'$, so that the seat may be adjusted to suit the size of the rider, and below the seat C is secured to the axle D the boot J for carrying parcels, &c.

The whiffletree K may be attached to the vehicle in any suitable manner; but I prefer to attach it by means of the iron K', bent to receive the whiffletree, and secured at its ends to the cross-pieces F F by clips or bolts, as shown clearly in Fig. 1.

By constructing the vehicle as described, the body may be adjusted to vary its leverage action upon the springs to adapt the springs to the weight of the rider, and this adjustment can be effected without removing nuts and bolts or other fastening device, and by supporting the body from the thills upon the springs E the horse motion is in a large degree neutralized.

Having thus fully described my invention, I claim as new and desire to secure by Letters Patent—

1. The curved side pieces, A, adjustably connected to the thills and adjustably connected to the springs E, in combination with the adjustable seat C, substantially as described.

2. The boot J, secured to the axle D beneath the seat C, substantially as described.

3. The springs E, yoke I, and side pieces, A, in combination with the notched plates H and the series of notches $d$, substantially as described.

EMERY W. BAXTER.

Witnesses:
J. J. STANTON,
A. G. GOODNOW.